United States Patent
Kim et al.

(10) Patent No.: US 9,785,550 B1
(45) Date of Patent: Oct. 10, 2017

(54) DATA STORAGE DEVICE AND OPERATING METHOD THEREOF

(71) Applicant: SK hynix Inc., Gyeonggi-do (KR)

(72) Inventors: Se Hyun Kim, Gyeonggi-do (KR); Yeong Sik Yi, Gyeonggi-do (KR); Sung Kwan Hong, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 15/363,345

(22) Filed: Nov. 29, 2016

(30) Foreign Application Priority Data

Aug. 2, 2016  (KR) .................. 10-2016-0098493

(51) Int. Cl.
*G06F 12/02* (2006.01)

(52) U.S. Cl.
CPC .. *G06F 12/0261* (2013.01); *G06F 2212/1036* (2013.01); *G06F 2212/1044* (2013.01)

(58) Field of Classification Search
CPC .................................................. G06F 12/0246
USPC ......................................................... 711/154
See application file for complete search history.

(56) References Cited

U.S. PATENT DOCUMENTS

| | | | |
|---|---|---|---|
| 2007/0030734 A1* | 2/2007 | Sinclair | G06F 3/0605 365/185.11 |
| 2009/0125671 A1* | 5/2009 | Flynn | G06F 9/52 711/103 |
| 2010/0161880 A1* | 6/2010 | You | G11C 16/349 711/103 |
| 2014/0215129 A1* | 7/2014 | Kuzmin | G06F 12/0246 711/103 |
| 2016/0034206 A1* | 2/2016 | Ryan | G11C 16/349 711/103 |
| 2016/0170663 A1* | 6/2016 | Masumoto | G06F 3/0616 711/159 |
| 2016/0188219 A1* | 6/2016 | Peterson | G06F 3/0679 711/103 |

FOREIGN PATENT DOCUMENTS

KR    101087308    11/2011

* cited by examiner

*Primary Examiner* — Min A Huang
(74) *Attorney, Agent, or Firm* — IP & T Group LLP

(57) ABSTRACT

A data storage device includes a nonvolatile memory device including a plurality of memory areas; and a controller configured to perform a reclaim operation for the plurality of memory areas, based on read counts of the plurality of memory areas, increase a reclaim count of the plurality of memory areas, and perform a wear leveling operation for the plurality of memory areas, based on the reclaim count.

17 Claims, 6 Drawing Sheets

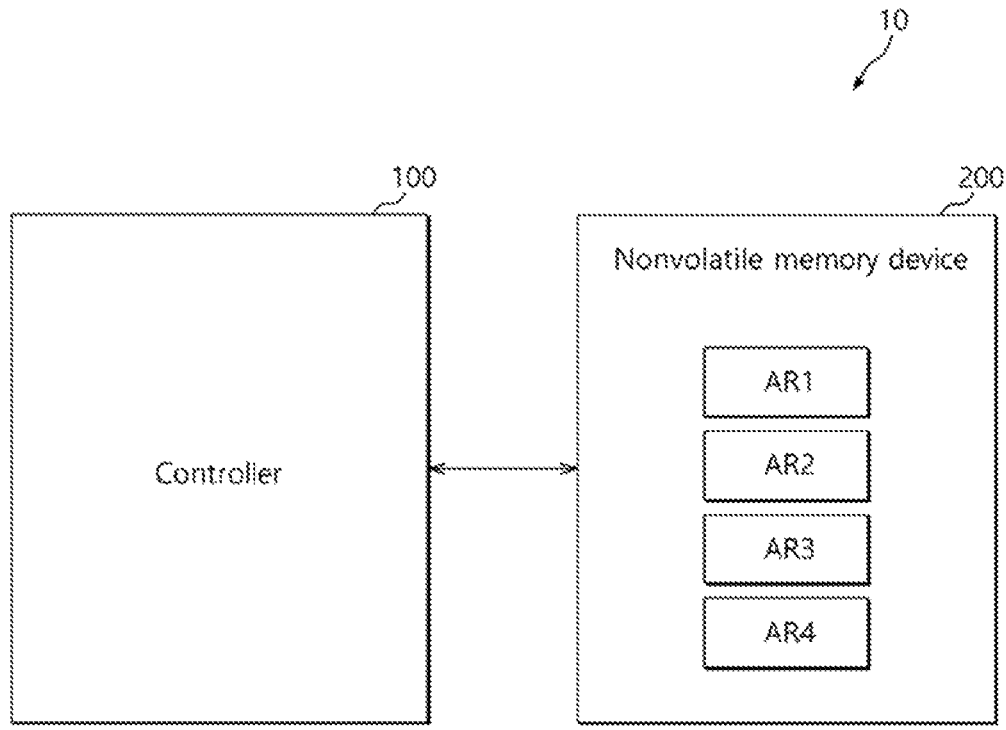

FIG.2B

| Memory area | RD_CT | RCL_CT |
|---|---|---|
| AR1 | 60 | |
| AR2 | 85 | 10 -> 11 |
| AR3 | (100) | |
| AR4 | 95 | |

Reclaim operation → AR3

RD_TH = 100
RCL_TH = 30

FIG.2C

| Memory area | RD_CT | RCL_CT |
|---|---|---|
| AR1 | 35 | |
| AR2 | 20 | (30) |
| AR3 | 5 | |
| AR4 | 80 | |

Wear leveling operation

RD_TH = 100
RCL_TH = 30

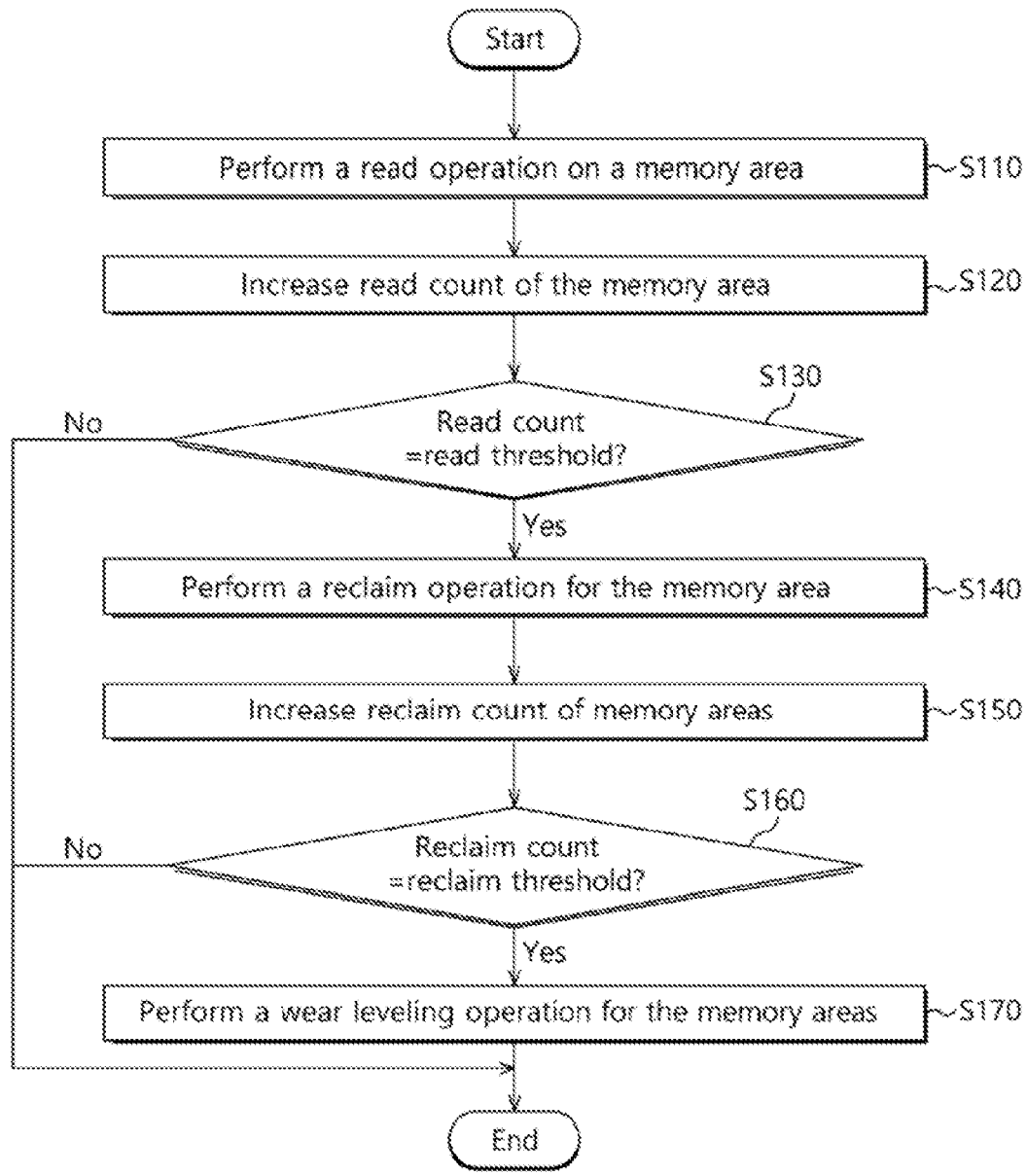

DATA STORAGE DEVICE AND OPERATING METHOD THEREOF

CROSS-REFERENCES TO RELATED APPLICATION

The present application claims priority under 35 U.S.C. §119(a) to Korean application number 10-2016-0098493, filed on Aug. 2, 2016, in the Korean Intellectual Property Office, which is incorporated herein by reference in its entirety.

BACKGROUND

1. Technical Field

Various embodiments generally relate generally to a data storage device and, more particularly, to a data storage device including a nonvolatile memory device.

2. Related Art

Data storage devices store data provided by an external device in response to a write request. Data storage devices may also provide stored data to an external device in response to a read request. Examples of external devices that use data storage devices include portable and non-portable electronic devices such as desktop computers, laptops, notebooks, notepads, tablet computers, digital cameras, cellular phones, smart phones, smart cards, hand-held translators, navigators and the like. Data storage devices may be embedded in an external device during manufacturing of the external device or may be fabricated separately and then connected afterwards to an external device.

SUMMARY

Various embodiments are directed to a data storage device for performing a wear leveling operation on a plurality of memory areas of a nonvolatile memory device.

In an embodiment, a data storage device may include: a nonvolatile memory device including a plurality of memory areas; and a controller suitable for performing a reclaim operation on the plurality of memory areas based on read counts of the plurality of memory areas, increasing a reclaim count of the plurality of memory areas, and performing a wear leveling operation on the plurality of memory areas based on the reclaim count.

In an embodiment, a method for operating a data storage device may include: performing a reclaim operation on a plurality of memory areas, based on read counts of the plurality of memory areas; increasing a reclaim count of the plurality of memory areas; and performing a wear leveling operation on the plurality of memory areas based on the reclaim count.

In an embodiment, a data storage device may include: a nonvolatile memory device including a plurality of memory areas; and a controller suitable for performing a wear leveling operation on the plurality of memory areas, by referring to erase counts of the plurality of memory areas after performing a read operation on the plurality of memory areas.

BRIEF DESCRIPTION OF THE DRAWINGS

The above and other features and advantages of the present invention will become more apparent to those skilled in the relevant art by the following detailed description with reference to the attached drawings in which:

FIG. 1 is a block diagram illustrating a data storage device in accordance with an embodiment of the present invention.

FIGS. 2A to 2C are diagrams Illustrating an operating method of a controller of FIG. 1 to perform a wear leveling operation based on read counts and a reclaim count of memory areas.

FIG. 3 is a flow chart of an operating method of the data storage device of FIG. 1.

DETAILED DESCRIPTION

Figure 4:
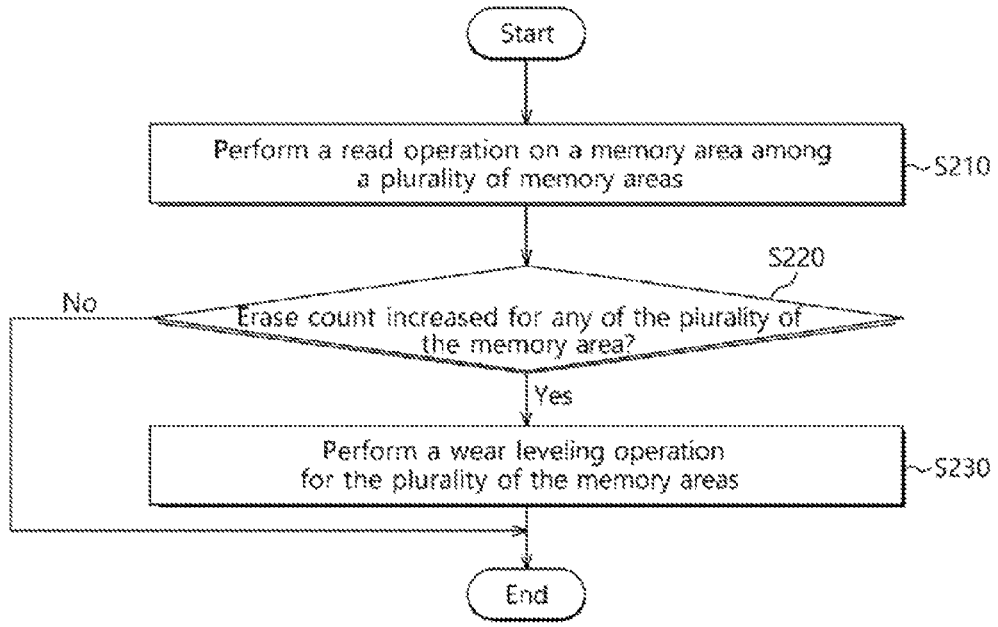
FIG. 4 is a flow chart of another operating method of the data storage device of FIG. 1.

Hereinafter, a data storage device and an operating method thereof according to the present invention will be described with reference to the accompanying drawings through exemplary embodiments of the present invention. The present invention may, however, be embodied in different forms and should not be construed as being limited to the embodiments set forth herein. Rather, these embodiments are provided to describe the present invention in sufficient detail so that a person skilled in the art to which the invention pertains can practice the present invention.

It is to be understood that embodiments of the present invention are not limited to the particulars shown in the drawings, that the drawings are not necessarily to scale, and, in some instances, proportions may have been exaggerated in order to more clearly depict certain features of the invention. While particular terminology is used, it is to be appreciated that the terminology used is for describing particular embodiments only and is not intended to limit the scope of the present invention.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, an element (also referred to as a feature) described in connection with one embodiment may be used singly or in combination with other elements of another embodiment, unless specifically indicated otherwise.

Referring now to FIG. 1, a data storage device 10 is provided, in accordance with an embodiment of the present invention. The data storage device 10 may be configured to store data provided from an external device, in response to a write request from the external device. Also, the data storage device 10 may be configured to provide stored data to the external device, in response to a read request from the external device. The external device may be operatively coupled with the data storage device. Any suitable coupling apparatus and communication scheme may be employed. For example, the data storage device 10 may be configured as or form part of a Personal Computer Memory Card International Association (PCMCIA) card, a Compact Flash (CF) card, a smart media card, a memory stick, various multimedia cards (MMC, eMMC, RS-MMC, and MMC-Micro), various secure digital cards (SD, Mini-SD, and Micro-SD), a Universal Flash Storage (UFS), a Solid State Drive (SSD) and the like.

The data storage device 10 according to the embodiment of FIG. 1, may include a controller 100 and a nonvolatile memory device 200 operatively coupled to each other. The nonvolatile memory device may include a plurality of memory areas, for example, memory areas AR1, AR2, AR3, and AR4. It should be understood that the number of the memory areas in the nonvolatile memory device may differ on design and is not limited to four. Also, while it is illustrated in FIG. 1 that the data storage device 10 includes one nonvolatile memory device 200, it is to be noted that the embodiment is not limited thereto and, hence, the data storage device 10 may include one, two or more nonvolatile memory devices 200 operatively coupled to the controller 100.

The controller 100 may control an operation of the data storage device 10. For example, the controller 100 may control the performance of a write operation for storing write data in the nonvolatile memory device 200 in response to a write request received from the external device. The write data and an address for the write data may be received together with the write request from the external device. Or, in another example, the controller, may control the performance of a read operation for reading data stored in the nonvolatile memory device 200 and for transmitting the read data to the external device in response to a read request and an address received from the external device.

The controller 100 may manage a read count for each of the memory areas AR1 to AR4 of the nonvolatile memory device 200. The read counts may therefore correspond to the memory areas AR1 to AR4, respectively. Hence, the controller 100 may manage a first read count for the first memory are AR1, a second read count for the second memory area AR2, a third read count for the third memory area and a fourth read count for the fourth memory area AR4. In operation, the controller 100 may perform a read operation on a memory area among the memory areas AR1 to AR4, and increase the read count of the memory area on which the read operation is performed. It should be understood, that while FIG. 1 illustrates that an example wherein only four memory areas AR1 to AR4 are included in the nonvolatile memory device 200, and therefore only four read counts need to be managed by the controller 100, i.e., one read count for each memory area, the embodiment is not limited in this way and the controller 100 may manage a plurality of read counts, one for each of a plurality of memory areas of the memory device 200. So for example, if the memory device 200 includes ten memory areas AR1 to AR10 then the controller 100 may manage ten read counts, i.e., one read count for each of the ten memory areas AR1 to AR10.

Referring now again to the embodiment illustrated in FIG. 1, each of the memory areas AR1 to AR4 may include a plurality of memory units, and the controller 100 may perform a read operation in units of memory units. For example, the memory areas AR1 to AR4 may be memory blocks, and the memory units may be pages, each page including a plurality of memory cells for storing data. A page may be defined as a plurality of memory cells operatively coupled to the same word line. Since the controller 100 manages one read count for each memory area AR1 to AR4 of the nonvolatile memory device 200, each time a read operation is performed on any one among the memory units which are included in a memory area, the controller 100 may increase the read count of the corresponding memory area.

The controller 100 may perform a reclaim operation on a memory area among the memory areas AR1 to AR4, based on the read counts of the memory areas AR1 to AR4. For example, the controller 100 may check the read counts to determine whether a read count among the first to fourth read counts for the respective first to fourth memory areas AR1 to AR4 has reached a read threshold. If a read count among the first to fourth read counts has reached a read threshold the controller 100 may then perform a reclaim operation on the memory area for which the read count has reached the read threshold. For ease of reference, a memory area having a read count that has reached the read threshold will also be referred to hereinafter as a reclaimable memory area. The controller 100 may perform the reclaim operation for the reclaimable memory area by copying valid data stored in the reclaimable memory area, to an empty memory area of the memory device 200, and then performing an erase operation on the reclaimable memory area.

Generally, a read disturbance is induced to the memory cells of a memory area when a read operation is performed in a memory area which may gradually damage data stored in the memory area. By performing a reclaim operation on a reclaimable memory area i.e., a memory area on which the number of performed read operations has reached a read threshold number, the controller 100 may recover the data stored in the reclaimable memory area before they are irreparably damaged, restore the recovered data and store them in a different memory area. The reclaimable memory area after the data stored therein have been copied in a different memory area, may be erased to become an empty memory area.

The controller 100 may also maintain a reclaim count for the memory areas AR1 to AR4 of the memory device 200. Hence, when the controller is performing a reclaim operation for one of the memory areas, the controller 100 may then increase a reclaim count of the memory areas AR1 to AR4. The controller 100 may manage one reclaim count for all of the memory areas AR1 to AR4, and accordingly, may increase the reclaim count each time a reclaim operation is performed for any one of the memory areas AR1 to AR4.

Meanwhile, even when a write request for the nonvolatile memory device 200 is not received from the external device but only read requests are continuously received from the external device, due to an Internal management operation, for example, a reclaim operation of the controller 100 for the nonvolatile memory device 200, a write operation for the nonvolatile memory device 200 may be performed. As a result, even though there is no write request from the external device, the memory areas AR1 to AR4 may be worn out due to the write operations performed by the controller 100 itself as part of the reclaim operation. Therefore, even when only read requests are received from the external device, the wear of the memory areas AR1 to AR4 should be consistently leveled. According to an embodiment, the controller 100 may perform a wear leveling operation on the memory areas AR1 to AR4, based on the reclaim count for the memory areas AR1 to AR4. As a consequence, even though only read requests are received from the external device, the wear of the memory areas AR1 to AR4 may be consistently leveled. For example, the controller 100 may perform a wear leveling operation on the memory areas AR1 to AR4, when the reclaim count for the memory areas AR1 to AR4 has reached a reclaim threshold. The controller 100 may perform a wear leveling operation depending on the wear level of the memory areas AR1 to AR4, so that the memory areas AR1 to AR4 may be evenly used. The controller 100 may perform a wear leveling operation according to various wear leveling schemes.

The controller 100 may manage erase counts of the memory areas AR1 to AR4 for various purposes. The controller 100 may maintain an erase count for each of the memory areas AR1 to AR4, respectively. In this case, after performing a read operation on the memory areas AR1 to AR4 in response to a read request from the external device, the controller 100 may perform a wear leveling operation on the memory areas AR1 to AR4, by referring to the erase counts of the memory areas AR1 to AR4. For example, by comparing the erase counts for the memory areas AR1 to AR4 before and after performing a read operation, if any one of the erase counts for the memory areas AR1 to AR4 has increased, the controller 100 may perform a wear leveling operation. An increase in one of the erase counts of the memory areas AR1 to AR4 may mean that a read reclaim operation has been performed for a reclaimable memory area among the memory areas AR1 to AR4 following a read operation because the reclaimable memory area has reached a read count that is equal to a threshold read count. Hence, an increase in one of the erase counts means that a substantial number of additional operations have been performed on the memory areas AR1 to AR4 as compared to before performing the read operation. Therefore, by comparing the erase counts before and after performing a read operation, the controller 100 may perform a wear leveling operation and thus consistently level the wear of the memory areas AR1 to AR4 even though only read requests are received from the external device.

Further, the controller 100 may keep a cumulative count of the size of the write data which are received from the external device and may perform a wear leveling operation on the memory areas AR1 to AR4, based on the cumulative count of the size of the write data. In detail, the controller 100 may perform a wear leveling operation on the memory areas AR1 to AR4, when cumulative count of the size of the write data has reached a data size threshold. Therefore, the controller 100 may consistently level the wear of the memory areas AR1 to AR4 that is caused by write requests from the external device, according to a predetermined data size threshold.

The nonvolatile memory device 200 may store data transmitted from the controller 100 and may read stored data and transmit read data to the controller 100, according to control of the controller 100. The nonvolatile memory device 200 may include the memory areas AR1 to AR4. While it is illustrated in FIG. 1 that the nonvolatile memory device 200 includes four memory areas AR1 to AR4, it is to be noted that the embodiment is not limited thereto.

The nonvolatile memory device 200 may include a flash memory, such as a NAND flash or a NOR flash, a Ferroelectrics Random Access Memory (FeRAM), a Phase-Change Random Access Memory (PCRAM), a Magnetoresistive Random Access Memory (MRAM), a Resistive Random Access Memory (ReRAM), and the like.

FIGS. 2A to 2C are diagrams explaining an operating method of the controller 100 of FIG. 1 to perform a wear leveling operation based on read counts RD_CT and a reclaim count RCL_CT of the memory areas AR1 to AR4. In FIGS. 2A to 2C, it is assumed that a read threshold RD_TH is set to "100" and a reclaim threshold RCL_TH is set to "30."

Referring to FIG. 2A, the read counts RD_CT for the respective four memory areas AR1 to AR4 of the data storage device 200 may have the values of "25", "50", "65" and "70". Also, the reclaim count RCL_CT for the four memory areas RCL_CT may have a value of "10". Then, the controller 100 may perform a read operation on, for example, a fourth memory area AR4. The controller 100 may increase the read count RD_CT of the fourth memory area AR4 from "70" to "71." Since the read count RD_CT of the fourth memory area AR4 has not reached the read threshold RD_TH, a reclaim operation on the fourth memory area AR4 is not performed. Also, since the reclaim count RCL_CT has not reached the reclaim threshold RCL_TH, a wear leveling operation on the memory areas AR1 to AR4 is not performed.

Referring to FIG. 2B, as the read counts RD_CT increase with the lapse of time, the read count RD_CT of a third memory area AR3 may reach the read threshold RD_TH of "100" at a certain time. More specifically, FIG. 2B shows a state of the data storage device 10 wherein a read operation has been performed on the third memory area AR3 and wherein the read counts RD_CT for the respective four memory areas AR1 to AR4 of the data storage device 200 have the values of "60", "85", "100" and "95". Accordingly, the controller 100 may then perform a reclaim operation on the third memory area AR3 and increase the reclaim count RCL_CT of the memory areas AR1 to AR4 from "10" to "11." Since the reclaim count RCL_CT has not reached the reclaim threshold RCL_TH, a wear leveling operation on the memory areas AR1 to AR4 is not performed.

Referring to FIG. 2C, as time goes on, the reclaim count RCL_CT of the memory areas AR1 to AR4 may reach the reclaim threshold RCL_TH of "30". Accordingly, the controller 100 may perform a wear leveling operation on the memory areas AR1 to AR4. After performing the wear leveling operation on the memory areas AR1 to AR4, the controller 100 may initialize the reclaim count RCL_CT of the memory areas AR1 to AR4.

Hence, according to an embodiment of the present invention, the lifetime of the nonvolatile memory device 200 may be extended by performing a wear leveling operation for the nonvolatile memory device 200 during a time period in which only read requests are continuously received from the external device.

FIG. 3 is a flow chart explaining an operating method of the data storage device 10 of FIG. 1.

Referring to FIG. 3, at step S110, the controller 100 may perform a read operation on any one memory area among the memory areas AR1 to AR4 of the nonvolatile memory device 200, in response to a request from the external device.

At step S120, the controller 100 may increase a read count of a memory area on which the read operation is performed.

At step S130, the controller 100 may determine whether the read count of the memory area on which the read operation is performed has reached a read threshold. When the read count has not reached the read threshold ("No" at step S130), the process may be ended. When the read count has reached the read threshold ("Yes" at step S130), the process may proceed to step S140.

At the step S140, the controller 100 may perform a reclaim operation on the memory area corresponding to the read count that has reached the read threshold.

At step S150, the controller 100 may increase a reclaim count of the memory areas AR1 to AR4.

At step S160, the controller 100 may determine whether the reclaim count has reached a reclaim threshold. When the reclaim count has not reached the reclaim threshold ("No" at step S160), the process may be ended. When the reclaim count has reached the reclaim threshold ("Yes" at step S160), the process may proceed to step S170.

At the step S170, the controller 100 may perform a wear leveling operation on the memory areas AR1 to AR4. After performing the wear leveling operation on the memory areas AR1 to AR4, the controller 100 may initialize the reclaim count of the memory areas AR1 to AR4.

FIG. 4 is a flow chart explaining another operating method of the data storage device 10 of FIG. 1.

Referring to FIG. 4, at step S210, the controller 100 may perform a read operation on any one memory area among the memory areas AR1 to AR4 of the nonvolatile memory device 200, in response to a request from the external device.

At step S220, the controller 100 may determine whether any one of the erase counts of the memory areas AR1 to AR4 has Increased in comparison with before the read operation is performed. An increase in an erase count may mean that a corresponding memory area is worn out when compared to before performing a read operation, and may be caused by, for example, a read reclaim operation. When the erase counts are not changed ("No" at step S220), the process may be ended. When any one of the erase counts has increased ("Yes" at step S220), the process may proceed to step S230. At the step S230, the controller 100 may perform a wear leveling operation on the memory areas AR1 to AR4.

Figure 5:
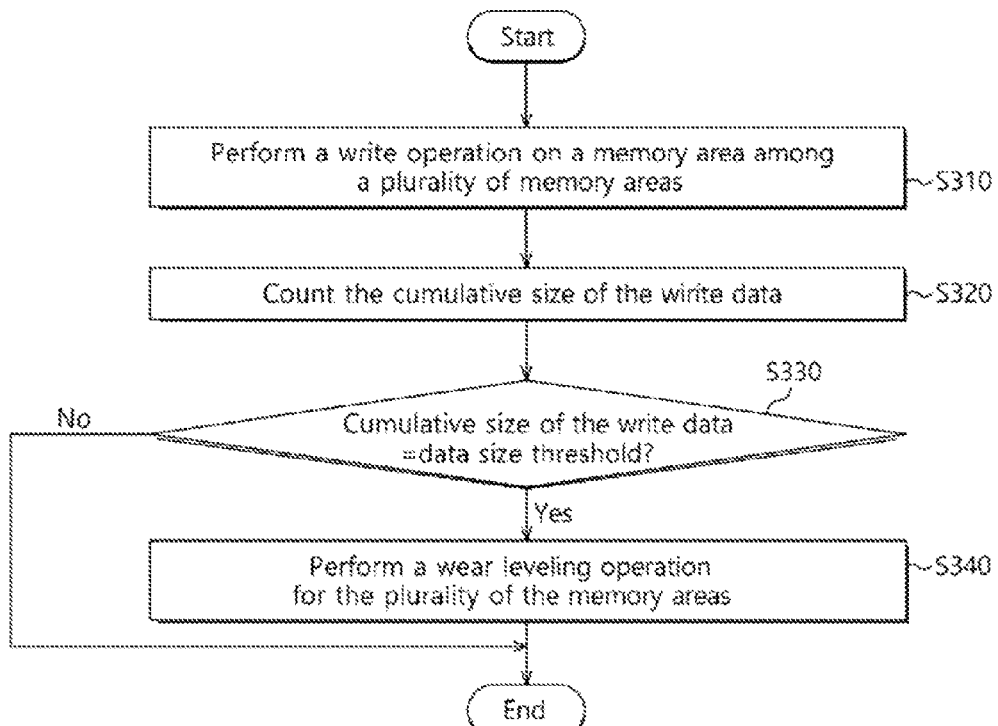
FIG. 5 is a flow chart of yet another operating method of the data storage device of FIG. 1.

FIG. 5 is a flow chart explaining yet another operating method of the data storage device 10 of FIG. 1.

Referring to FIG. 5, at step S310, the controller 100 may perform a write operation on any one memory area among the memory areas AR1 to AR4 of the nonvolatile memory device 200, in response to a request from the external device.

At step S320, the controller 100 may count the cumulative size of the received write data.

At step S330, the controller 100 may determine whether the size of the accumulated write data has reached a data size threshold. When the size of the accumulated write data has not reached the data size threshold ("No" at step S330), the process may be ended. When the size of the accumulated write data has reached the data size threshold ("Yes" at step S330), the process may proceed to step S340.

At the step S340, the controller 100 may perform a wear leveling operation on the memory areas AR1 to AR4.

Figure 6:
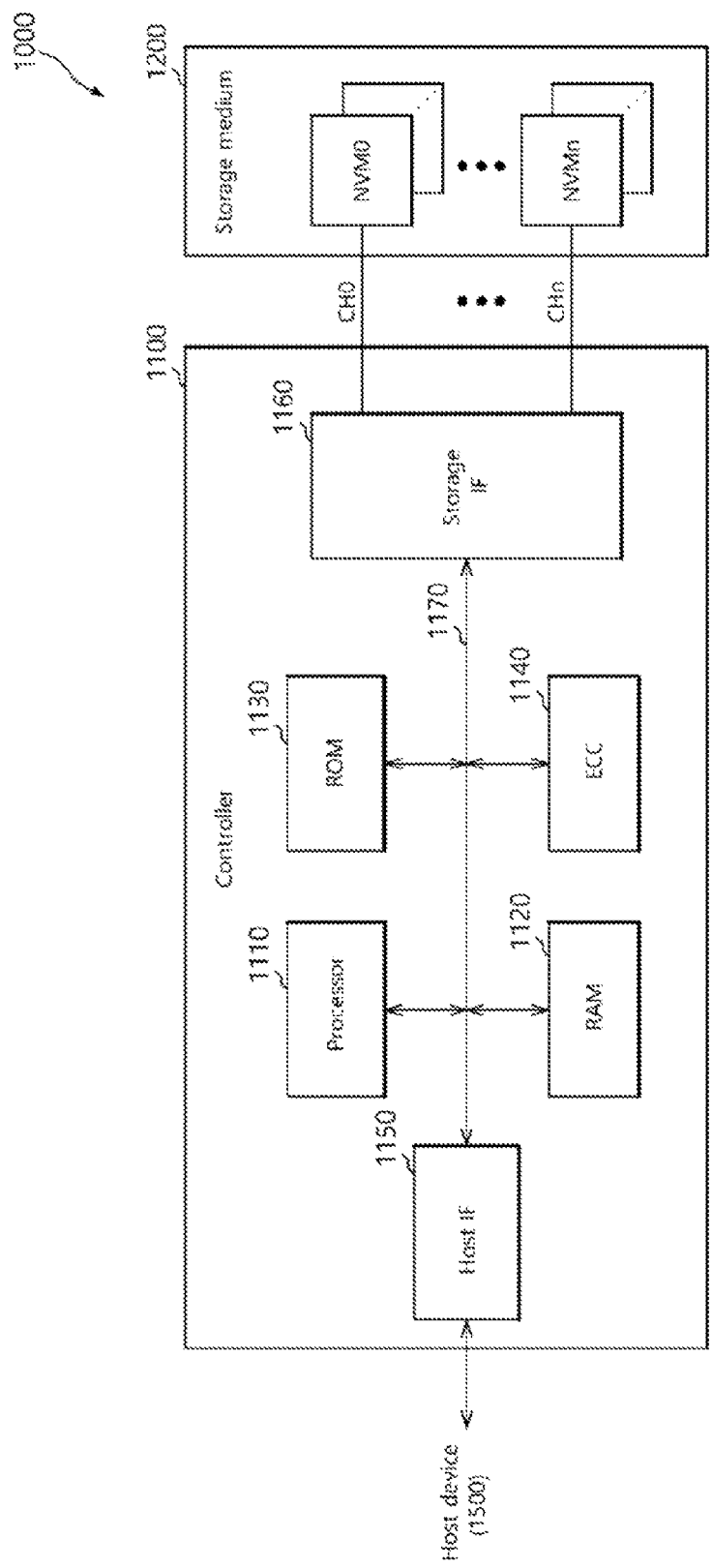
FIG. 6 is a block diagram illustrating a solid state drive (SSD) in accordance with an embodiment of the present invention.

FIG. 6 is a block diagram illustrating a solid state drive (SSD) 1000 in accordance with an embodiment of the present Invention.

The SSD 1000 may include a controller 1100 and a storage medium 1200.

The controller 1100 may control data exchange between a host device 1500 and the storage medium 1200. The controller 1100 may include a processor 1110, a Random Access Memory (RAM) 1120, a Read Only Memory (ROM) 1130, an Error Correction Code (ECC) unit 1140, a host interface 1150, and a storage medium interface 1160, operatively coupled via an internal bus 1170. The storage medium 1200 may include a plurality of nonvolatile memory devices NVM0 to NVMn each comprising a plurality of memory areas.

The controller 1100 may operate substantially similarly to the controller 100 shown in FIG. 1. The controller 1100 may perform a reclaim operation on a plurality of memory areas of a nonvolatile memory device among the plurality of nonvolatile memory devices NVM0 to NVMn, based on read counts of the plurality of memory areas, increase a reclaim count of the plurality of memory areas, and perform a wear leveling operation on the plurality of memory areas based on the reclaim count. The controller 1100 may manage erase counts of the plurality of memory areas, and perform a wear leveling operation when any one among the erase counts has increased after performing a read operation. Also, the controller 1100 may keep a cumulative count of the size of the write data received from an external device, and perform a wear leveling operation on the plurality of memory areas based on cumulative count of the size of the write data.

The processor 1110 may control general operations of the controller 1100. The processor 1110 may store data in the storage medium 1200 and read stored data from the storage medium 1200, in response to data processing requests from the host device 1500. In order to efficiently manage the storage medium 1200, the processor 1110 may control internal operations of the SSD 1000 such as a merge operation, a wear leveling operation, and so forth.

The RAM 1120 may store programs and program data to be used by the processor 1110. The RAM 1120 may temporarily store data transmitted from the host interface 1150 before transferring it to the storage medium 1200, and may temporarily store data transmitted from the storage medium 1200 before transferring it to the host device 1500.

The ROM 1130 may store program codes to be read by the processor 1110. The program codes may Include commands to be processed by the processor 1110, such that the processor 1110 may control the internal units of the controller 1100.

The ECC unit 1140 may encode data to be stored in the storage medium 1200, and may decode data read from the storage medium 1200. The ECC unit 1140 may detect and correct an error occurred in data, according to an ECC algorithm.

The host interface 1150 may exchange data processing requests, data, etc. with the host device 1500.

The storage medium interface 1160 may transmit control signals and data to the storage medium 1200. The storage medium interface 1160 may receive data from the storage medium 1200. The storage medium interface 1160 may be coupled to the storage medium 1200 through a plurality of channels CH0 to CHn.

Figure 7:
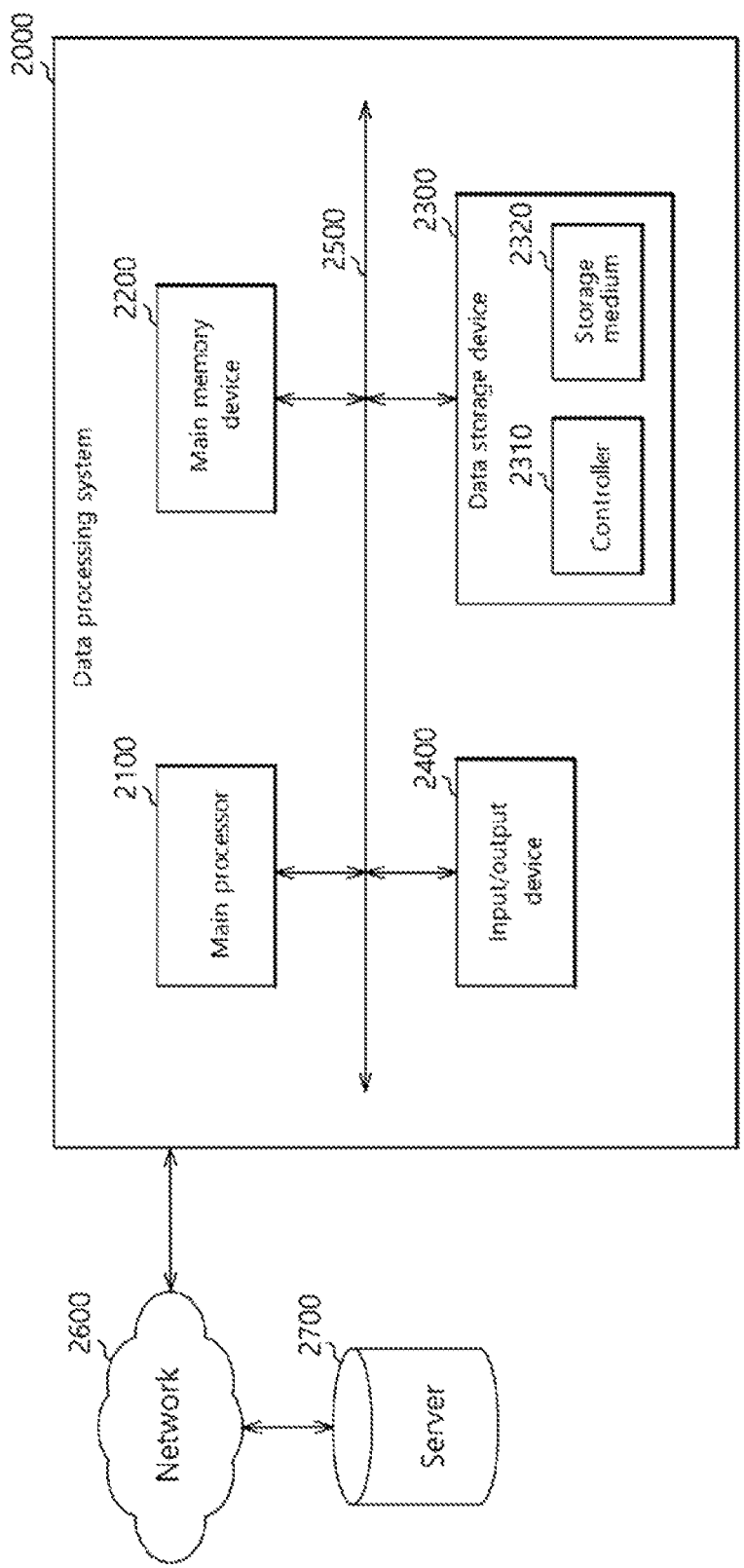
FIG. 7 is a block diagram illustrating a data processing system to which the data storage device of FIG. 1 is applied, in accordance with an embodiment of the present invention.

The storage medium 1200 may include the plurality of nonvolatile memory devices NVM0 to NVMn. Each of the plurality of nonvolatile memory devices NVM0 to NVMn may perform a write operation and a read operation according to control of the controller 1100. FIG. 7 is a block diagram illustrating a data processing system 2000 to which the data storage device 10 of FIG. 1 is applied, in accordance with an embodiment of the present invention.

The data processing system 2000 may include a computer, a laptop, a netbook, a smart phone, a digital TV, a digital camera, a navigator, etc. The data processing system 2000 may include a main processor 2100, a main memory device 2200, a data storage device 2300, and an input/output device 2400. The internal units of the data processing system 2000 may exchange data, control signals, etc. through a system bus 2500.

The main processor 2100 may control general operations of the data processing system 2000. The main processor 2100 may be a central processing unit, for example, such as a microprocessor. The main processor 2100 may execute softwares such as an operating system, an application, a device driver, and so forth, on the main memory device 2200.

The main memory device 2200 may store programs and program data to be used by the main processor 2100. The main memory device 2200 may temporarily store data to be transmitted to the data storage device 2300 and the input/output device 2400.

The data storage device 2300 may include a controller 2310 and a storage medium 2320. The data storage device 2300 may be configured and operate substantially similarly to the data storage device 10 of FIG. 1.

The input/output device 2400 may include a keyboard, a scanner, a touch screen, a screen monitor, a printer, a mouse, or the like, capable of exchanging data with a user, such as receiving a command for controlling the data processing system 2000 from the user or providing a processed result to the user.

According to an embodiment, the data processing system 2000 may communicate with at least one server 2700 through a network 2600 such as a local area network (LAN), a wide area network (WAN), a wireless network, and so on. The data processing system 2000 may include a network interface (not shown) to access the network 2600.

While various embodiments have been described above, it will be understood to those skilled in the art that the embodiments described are examples only. Accordingly, the data storage device and the operating method thereof described herein should not be limited to the described embodiments. It will be apparent to those skilled in the art to which the present invention pertains that various other changes and modifications may be made without departing from the spirit and scope of the invention as defined in the following claims.

What is claimed is:

1. A data storage device comprising:
    a nonvolatile memory device including a plurality of memory areas; and
    a controller suitable for performing a reclaim operation on the plurality of memory areas based on read counts of the plurality of memory areas, increasing a reclaim count of the plurality of memory areas, and performing a wear leveling operation on the plurality of memory areas based on the reclaim count,
    wherein the controller accumulates write data transmitted from an external device, and performs the wear leveling operation on the plurality of memory areas, based on a size of the accumulated write data.

2. The data storage device according to claim 1, wherein the controller determines whether any one of the read counts reaches a read threshold, and performs the reclaim operation on a memory area corresponding to the read count that reaches the read threshold, among the plurality of memory areas.

3. The data storage device according to claim 2, wherein the controller performs the reclaim operation by copying valid data stored in the memory area, to an empty memory area, and performing an erase operation on the memory area.

4. The data storage device according to claim 1, wherein the controller determines whether the reclaim count reaches a reclaim threshold, and performs the wear leveling operation on the plurality of memory areas depending on a determination result.

5. The data storage device according to claim 1, wherein the controller performs a read operation on any one of the plurality of memory areas, and increases the read count of the memory area on which the read operation is performed, among the read counts.

6. The data storage device according to claim 1, wherein the controller determines whether the size of the accumulated write data reaches a data size threshold, and performs the wear leveling operation on the plurality of memory areas, depending on a determination result.

7. The data storage device according to claim 1, wherein the controller manages the read counts correspond to the plurality of memory areas, respectively, and manages the reclaim count for the plurality of memory areas.

8. A method for operating a data storage device, the method comprising:
    performing a reclaim operation on a plurality of memory areas, based on read counts of the plurality of memory areas;
    increasing a reclaim count of the plurality of memory areas;
    performing a wear leveling operation on the plurality of memory areas based on the reclaim count;
    accumulating write data transmitted from an external device; and
    performing the wear leveling operation on the plurality of memory areas, based on a size of the accumulated write data.

9. The method according to claim 8, wherein the performing of the reclaim operation comprises:
    determining whether any one of the read counts reaches a read threshold; and
    performing the reclaim operation on a memory area corresponding to the read count that reaches the read threshold, among the plurality of memory areas, depending on a determination result.

10. The method according to claim 9, wherein the performing of the reclaim operation comprises:
    copying valid data stored in the memory area, to an empty memory area; and
    performing an erase operation on the memory area.

11. The method according to claim 8, wherein the performing of the wear leveling operation comprises:
    determining whether the reclaim count reaches a reclaim threshold; and
    performing the wear leveling operation on the plurality of memory areas depending on a determination result.

12. The method according to claim 8, further comprising:
    performing a read operation on any one of the plurality of memory areas; and
    increasing the read count of the memory area on which the read operation is performed, among the read counts.

13. The method according to claim 8, wherein the performing of the wear leveling operation comprises:
    determining whether the size of the accumulated write data reaches a data size threshold; and
    performs the wear leveling operation on the plurality of memory areas, depending on a determination result.

14. The method according to claim 8, wherein the read counts correspond to the plurality of memory areas, respectively, and the reclaim count corresponds to the plurality of memory areas.

15. A data storage device comprising:
    a nonvolatile memory device including a plurality of memory areas; and
    a controller suitable for performing a wear leveling operation on the plurality of memory areas, by referring to erase counts of the plurality of memory areas after performing a read operation on the plurality of memory areas,
    wherein the controller accumulates write data transmitted from an external device, and performs the wear leveling operation on the plurality of memory areas, based on a size of the accumulated write data.

16. The data storage device according to claim 15, wherein the controller performs the wear leveling operation when any one of the erase counts increases before and after performing the read operation.

17. The data storage device according to claim 15, wherein the erase counts correspond to the plurality of memory areas, respectively.

\* \* \* \* \*